No. 868,316. PATENTED OCT. 15, 1907.
H. B. ADLER.
MECHANICAL MOVEMENT.
APPLICATION FILED JUNE 19, 1905.

WITNESSES
George W. Hinton
John H. Spumaugh

INVENTOR.
Harris B. Adler.

UNITED STATES PATENT OFFICE.

HARRIS B. ADLER, OF ST. JOSEPH, MISSOURI, ASSIGNOR OF ONE-HALF TO NANCY ADELINA GARDNER, OF ST. JOSEPH, MISSOURI.

MECHANICAL MOVEMENT.

No. 868,316.  Specification of Letters Patent.  Patented Oct. 15, 1907.

Application filed June 19, 1905. Serial No. 265,911.

*To all whom it may concern:*

Be it known that I, HARRIS B. ADLER, a citizen of the United States, residing at St. Joseph, in the county of Buchanan and State of Missouri, have invented certain new and useful Improvements in Mechanical Movements, of which the following is a specification.

My invention relates to improvements in mechanical movements, which have for their objects the provision of mechanical movements, which will be novel and attractive features for the attraction of attention of observers of show windows, and which will at the same time be interesting and instructive as a display of the novel combination of mechanical parts, combined in said mechanical movements, and also comprise means for the closing and opening of electric circuits, for the operation of electric lights in said show windows, or for the operation of other electrical devices, synchronously with the action of said mechanical movements. I attain these objects by the mechanism illustrated in the accompanying drawing, in which;—

Figure 1:
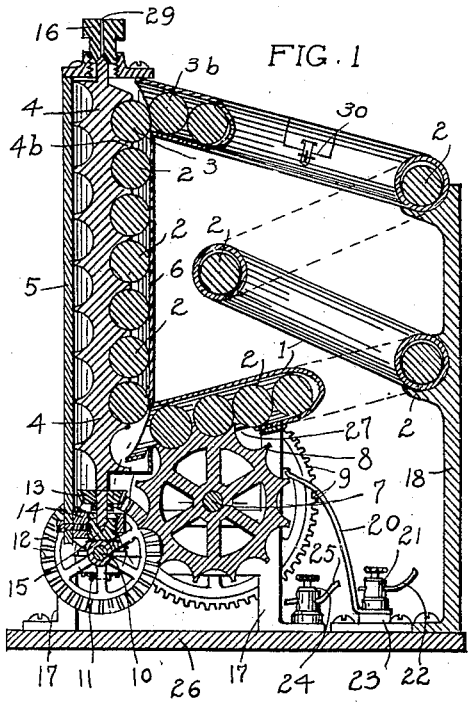
Figure 4:
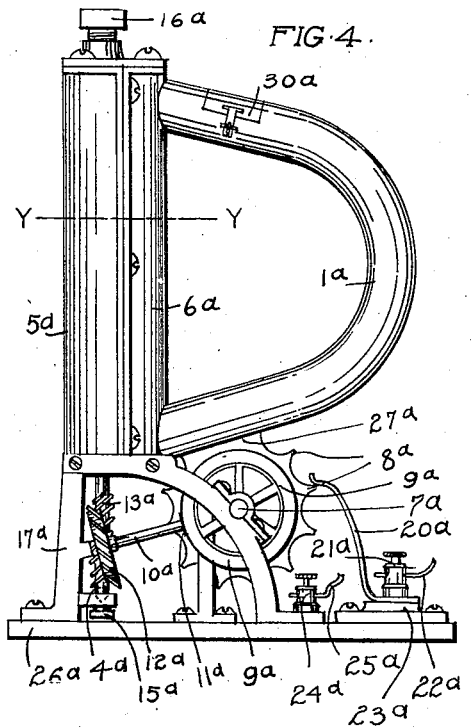
Figure 2:
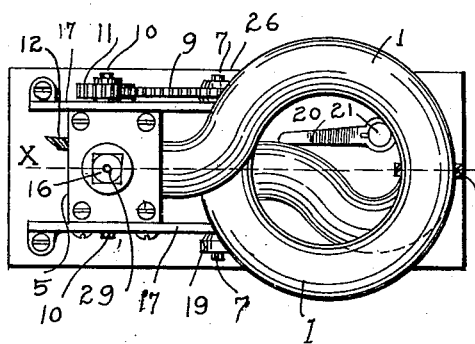
Figure 3:
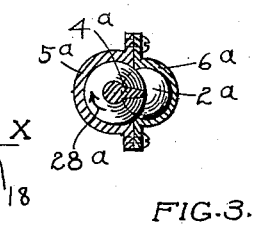

Figure 1. is a vertical section, cut on the line X X, seen in Fig. 2. Fig. 2. is a top plan. Fig. 3. is a horizontal section of the parts cut on the line Y Y seen in Fig. 4. Fig. 4 is a side elevation of one of the various forms, in which my invention may be constructed.

My invention, in its preferred form, as seen in Fig. 1, consists of an inclined, spiral ball chute, 1; preferably of glass tubing; the balls, 2, in chute 1; a screw or worm 4; a worm sleeve 5, preferably of glass, in which worm 4 is rotated; shaft 7; sprocket wheel 8, secured on shaft 7; gear wheel 9, secured on shaft 7; shaft 10; pinion 11, secured on shaft 10, and engaging gear wheel 9; bevel gear wheel 12, secured on shaft 10; bevel pinion 13, secured on the lower extremity of worm 4, and engaging bevel gear 12; bracket 14, cone seat screws 15 and 16, in which the ends of worm 4 rotate; metal frame 17 and support 18 for supporting the parts, and pulley 19, secured on shaft 7, seen in Fig. 2; also spring electric circuit closer 20, binding post 21, conductor 22, insulating block 23, binding post 24, conductor 25, and base 26, upon which my device is secured.

Inclined ball chute 1, is provided with slot 27, through which the teeth of wheel 8 project into chute 1, as seen in Fig. 1, and also with openings at each of its extremities, into vertical conduit 6, for the ingress and egress of balls 2.

In the operation of my invention, power is applied to pulley 19, (see Fig. 2,) by a belt, (not shown,) which causes shaft 7 to rotate, thereby rotating sprocket wheel 8, the teeth of which pass upward, one tooth in front of, and the next tooth behind each one of balls 2, in succession, and the described train of gears, which engage shaft 7 with worm 4, are so exactly proportioned in relation to the number of teeth on wheel 8, as will cause one complete rotation of worm 4, (which discharges one of balls 2, from the upper end of said worm,) to take place in exactly the same time in which one tooth of sprocket wheel 8 is moved sufficiently to pass one of balls 2, into worm 4.

By referring to Figs. 1 and 3, it will be seen that balls 2, in worm 4, are vertically guided by conduit 6, and that the rotation of worm 4, in the direction indicated by arrow 28$^a$, will cause balls 2 to be elevated thereby.

Referring to Fig. 1., where it is desired to synchronize the movement of other, or distant devices, or mechanisms, (not shown,) with the movement of my invention, I provide electric conductors, 25, electrically connected by binding post 24, with metal frame 17 and insulating block 23, (on base 26,) upon which is secured the binding post 21, electrically connected with conductor 22, and circuit closer 20, for closing and opening an electric circuit, from a source of electricity, (not shown,) through binding post 24, frame 17, shaft 7, wheel 8, circuit closer 20, binding post 21 and conductor 22; when teeth of sprocket 8 are rotated into and out of contact with circuit closer 20.

By the cone seat screws 15 and 16, the bearings of the extremities of worm 4 are adjusted. Through aperture 29, lubricant (not shown,) is admitted for upper bearing of worm 4, from which any excessive amount of said lubricant will gravitate on to and lubricate the surface of worm 4.

In Fig. 1., the removable lid 30 permits the admission of balls 2 in to ball chute 1.

In Fig. 4 is seen one of the various forms, in which my invention may be constructed, and one of the variously formed and arranged trains of gears, for conveying movement of wheel 8$^a$, to the worm 4; in which the lower extremity of worm 4$^a$, is provided with a gear worm 13$^a$, engaged with worm gear 12$^a$, on shaft 10$^a$, carrying bevel pinion 11$^a$, in engagement with bevel gear wheel 9$^a$, on shaft 7$^a$, carrying sprocket wheel 8$^a$, the teeth of which pass through slot 27$^a$, into inclined ball chute 1$^a$.

It will be found that all the parts indicated with affix "a", are equivalent to and operate in the same manner as the similarly numbered parts, seen in Figs. 1, 2 and 3, and previously described.

Having fully described my invention, what I claim as new, and desire to secure by Letters Patent, is:—

1. In a mechanical movement; the combination with an inclined ball chute and balls therein of a sprocket wheel having its sprocket teeth passing into said chute and between and engaging said balls; a worm elevator for receiving, elevating and discharging said balls, a suitable train of gears for conveying movement from said sprocket wheel to the worm of said worm elevator, a shaft for said sprocket wheel and a drive pulley upon said shaft.

2. In a mechanical movement a sprocket wheel, there being teeth upon the periphery of said wheel, a shaft for said sprocket wheel, a drive pulley on said shaft, an inclined spiral ball chute, there being a slot in said chute to admit the teeth of said sprocket wheel; balls within said chute, a worm for elevating said balls said balls extending in a continuous chain from and into said worm and in engagement with the teeth of said sprocket wheel, as shown, and suitable means for conveying motion from said sprocket wheel to the worm of said worm elevator.

3. In a mechanical movement, a wheel, having sprocket teeth thereon; an inclined ball chute, balls within and extending continuously through said chute, to and in engagement with the teeth of said wheel; a worm sleeve, having a ball conduit formed longitudinally therein; a worm within said sleeve, for elevating said balls; cone seat bearings for the extremities of said worm the upper one of said bearings having means for admission of lubricants into said bearings and on said worm; suitable power transmitting means, for transmitting power from said toothed wheel to said worm including a shaft for said toothed wheel, and a drive pulley on said shaft.

4. In a mechanical movement, an electric circuit closer, a toothed wheel, the teeth of which are arranged to electrically contact with and move from said circuit closer; an inclined ball chute, balls within said chute and in engagement with the teeth of said toothed wheel, a worm elevator for receiving, elevating and discharging said balls as described, a worm in said worm elevator, suitable means for conveying power from said toothed wheel to said worm of said worm elevator, a shaft for said toothed pheel and a drive pulley on said shaft.

In testimony whereof I affix my signature in presence of two witnesses.

HARRIS B. ADLER.

Witnesses:
JOHN H. SPUNANGLE,
GEORGE W. HINTON.